T. J. McTIGHE.
Nut-Locks.

No. 146,933. Patented Jan. 27, 1874.

WITNESSES
J. P. Connolly
Anthony. Connolly

INVENTOR
Thomas J. McTighe
By Connolly Bros.
Attorneys.

UNITED STATES PATENT OFFICE.

THOMAS J. McTIGHE, OF PHILADELPHIA, PENNSYLVANIA, ASSIGNOR OF ONE-HALF HIS RIGHT TO M. D. & T. A. CONNOLLY.

IMPROVEMENT IN NUT-LOCKS.

Specification forming part of Letters Patent No. 146,933, dated January 27, 1874; application filed December 31, 1873.

*To all whom it may concern:*

Be it known that I, THOMAS J. McTIGHE, of Philadelphia, in the county of Philadelphia and State of Pennsylvania, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification, in which—

Figure 1:
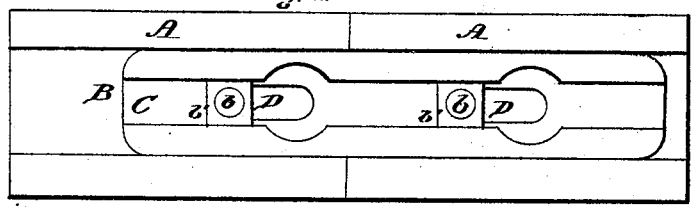
Figure 2:
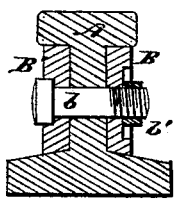

Figure 1 is a face or front view of my invention applied to a rail-joint. Fig. 2 is a transverse section of rail and nut-lock.

This invention has relation to nut-locks intended especially for application to the joints of railroad-rails.

The novelty consists in the peculiar construction of the fish-plate or lock-plate, which, for the purposes of my invention, is formed with elongated slots or holes for the passage of the bolt-shanks, and a longitudinal channel in its face corresponding in width with the nuts or bolt-heads, and sufficiently enlarged at certain points to allow the nuts to be freely turned. The locking of the nuts is accomplished by placing the plate over the bolts, so that the latter will pass through the slots at the centers of the channel enlargements, then turning on the nuts until they are properly tightened, with their edges respectively horizontal and vertical, and finally driving the plate lengthwise until the nuts enter the narrow portions of the channel, wherein they will be securely held, and any tendency to turn or become loose effectually prevented.

Referring to the accompanying drawing, A A designate the adjacent portions of two railroad-rails, producing a rail-joint, to which are applied the fish-plates B B', secured to the rails by means of the transverse bolts *b b*, provided with the nuts *b' b'*. C designates the longitudinal groove, channel, or recess in the face of one or both fish-plates, formed by rolling or otherwise. The channel or recess may be continuous, extending from end to end of the plate, as shown in the drawing, Fig. 1, or there may be short channels or recesses formed to accommodate each nut, respectively. D represents the elongated holes or slots, punched or otherwise formed in the plates, and extending lengthwise of the latter any distance required. Above and below the end, or such portion of each slot through which the bolts are made to pass when the plate is first put on, the channels or recesses are enlarged, so that, when the nut is placed on the bolt, it may be turned down against the surface of the plate or back of the channel or recess. The slots D extend from the centers of the enlargements referred to into the narrow portions of the channels or recesses.

When the nuts are fitted to the bolts they are tightened, with their upper and lower edges lying horizontally to coincide with the edges of the channel or recess, which latter is of equal to or of slightly greater width than the bolts. The plate is then driven in the direction of its length until the nuts enter the narrow portions of the recess, as before stated.

To avoid the tendency of the plates to be driven backward by the motion of the cars upon the rails, the plates should be so fitted to the rails, with reference to the direction which the trains usually run upon a certain line of track, that, from the tendency of the rails to move forward under the pressure of the engine-drivers, the plates will be displaced, with reference to said rails, in the direction required to move them in locking the nuts; hence the effect of the continued use of the plates is to render them more and more secure.

To allow the bolts and nuts to be removed, the plates are simply driven back until the nut-heads coincide with the channel enlargements, when they can be removed with facility.

The plates, constructed as described, may be applied to hold the bolt-heads as well as the nuts; but only one plate is slotted and provided with channel enlargements. The other plate may simply have the plain channel, or merely recesses of sufficient dimensions to receive the bolt-head or nut.

The nut-lock may be used with advantage in other places than the joints of railroad-rails, as it serves its purpose most effectively wherever applied.

A modification of the invention described is suggested in a plate having a ridge instead of a channel, and a nut having its inner surface channeled to coincide with said ridge. In such modification the surface of the ridged plate is made plain at points corresponding to the channel enlargements in the other form of plate, so as to allow the nut to be tightened upon the bolt before it is locked.

Instead of having a channel running lengthwise, the fish-plate may be simply formed with a ridge or re-enforcement above the slots, which, when the plate is moved, will effectually prevent the nut from turning.

What I claim, and desire to secure by Letters Patent, is—

A lock-plate for nuts or bolts, having slots running lengthwise and of less width than the nuts or bolt-heads, and having its surface channeled, recessed, or re-enforced, said elongated slots extending from the openings or enlargements, as described, into the channel or recess, or between the ridges, so that when said plate is moved lengthwise it will lock the nuts or bolts, substantially as described.

In testimony that I claim the foregoing I have hereunto set my hand this 30th day of December, 1873.

THOMAS J. McTIGHE.

Witnesses:
    THOS. A. CONNOLLY,
    J. B. CONNOLLY.